US012565014B2

(12) United States Patent
Kuntz et al.

(10) Patent No.: US 12,565,014 B2
(45) Date of Patent: Mar. 3, 2026

(54) METHODS FOR PRODUCING A STRUCTURAL COMPONENT

(71) Applicant: Premium Aerotec GmbH, Augsburg (DE)

(72) Inventors: Julian Kuntz, Augsburg (DE); Markus Kaden, Augsburg (DE); Marvin Schneider, Augsburg (DE)

(73) Assignee: Premium Aerotec GmbH, Augsburg (DE)

( * ) Notice: Subject to any disclaimer, the term of this patent is extended or adjusted under 35 U.S.C. 154(b) by 1157 days.

(21) Appl. No.: 17/222,413

(22) PCT Filed: Oct. 2, 2019

(86) PCT No.: PCT/EP2019/076736
§ 371 (c)(1),
(2) Date: Apr. 5, 2021

(87) PCT Pub. No.: WO2020/070204
PCT Pub. Date: Apr. 9, 2020

(65) Prior Publication Data
US 2022/0161508 A1    May 26, 2022

(30) Foreign Application Priority Data

Oct. 4, 2018    (DE) .......................... 102018217017.7

(51) Int. Cl.
B29C 70/46 (2006.01)
B29C 35/08 (2006.01)
(Continued)

(52) U.S. Cl.
CPC .......... B29C 70/46 (2013.01); B29C 35/0805 (2013.01); B29C 70/207 (2013.01);
(Continued)

(58) Field of Classification Search
CPC ..... B29C 70/46; B29C 70/207; B29C 43/203; B29C 33/06; B29C 70/44; B29C 70/342;
(Continued)

(56) References Cited

U.S. PATENT DOCUMENTS 5,591,369 A    1/1997  Matsen et al.
5,633,074 A    5/1997  Muroi et al.
(Continued)

FOREIGN PATENT DOCUMENTS

CA      2898021 A1    8/2014
DE      3727926 A1    3/1988
(Continued)

OTHER PUBLICATIONS

Naumann, et al., machine-translation by Clarivate Analytics of DE-102010050740-A1 with full foreign patent attached, May 10, 2012. (Year: 2012).*
(Continued)

*Primary Examiner* — Abbas Rashid
*Assistant Examiner* — Gregory C. Grosso
(74) *Attorney, Agent, or Firm* — Lerner David LLP

(57) ABSTRACT

Methods of manufacturing a structural component each include providing a preformed layered structure including a plurality of layers each having reinforcing fibers embedded in a thermoplastic matrix material, heating the layered structure in a cavity formed between a contour surface and an abutment member to a first temperature, which is greater than a melting point of the thermoplastic matrix material, and cooling the layer structure in the cavity to a solidification temperature which is, e.g., less than the melting point of the thermoplastic matrix material, while applying a compression pressure. According to a method, the compression pressure is generated by using a magnet device to generate a magnetic field directed transversely to the contour surface,
(Continued)

Figure 1:
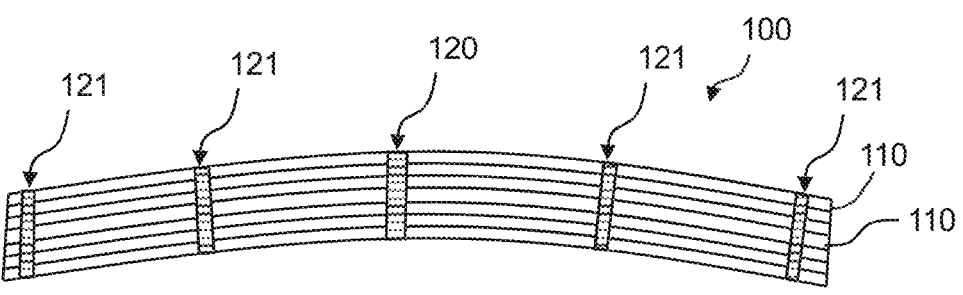

which pulls or compresses the abutment member and the contour surface relative to each other. According to a further method, inductive heating of the cavity occurs.

16 Claims, 8 Drawing Sheets

(51) Int. Cl.

| | | |
|---|---|---|
| *B29C 70/20* | (2006.01) | |
| *B29C 70/34* | (2006.01) | |
| *B29K 101/12* | (2006.01) | |
| *B29L 31/30* | (2006.01) | |

(52) U.S. Cl.
CPC .... *B29C 70/342* (2013.01); *B29C 2035/0811* (2013.01); *B29C 2035/0822* (2013.01); *B29K 2101/12* (2013.01); *B29L 2031/3076* (2013.01)

(58) Field of Classification Search
CPC ......... B29C 35/0805; B29C 2035/0811; B32B 2037/1081
USPC .......................................................... 156/242
See application file for complete search history.

(56) References Cited

U.S. PATENT DOCUMENTS

| | | | | |
|---|---|---|---|---|
| 5,808,281 | A | * | 9/1998 | Matsen ................... B29C 66/54 |
| | | | | 219/645 |
| 5,939,007 | A | * | 8/1999 | Iszczyszyn ........... B29C 70/446 |
| | | | | 264/258 |
| 5,952,067 | A | | 9/1999 | Head |
| 2002/0034624 | A1 | | 3/2002 | Harpell et al. |
| 2005/0035115 | A1 | | 2/2005 | Anderson et al. |
| 2008/0240954 | A1 | | 10/2008 | Morozumi et al. |
| 2008/0260954 | A1 | | 10/2008 | Paton et al. |
| 2011/0006460 | A1 | * | 1/2011 | Vander Wel ............ B30B 15/34 |
| | | | | 264/403 |
| 2011/0156305 | A1 | * | 6/2011 | Lonsdorfer .......... B29C 70/546 |
| | | | | 264/261 |
| 2012/0255947 | A1 | | 10/2012 | Matsen et al. |
| 2014/0050813 | A1 | * | 2/2014 | Balas ................. B29C 37/0089 |
| | | | | 425/388 |
| 2014/0131917 | A1 | | 5/2014 | Naumann et al. |
| 2014/0216642 | A1 | * | 8/2014 | Childress .............. B29C 43/203 |
| | | | | 156/379.6 |
| 2017/0240714 | A1 | * | 8/2017 | Ahmed .................... C08J 5/249 |
| 2017/0274603 | A1 | | 9/2017 | Iwata et al. |
| 2022/0161508 | A1 | | 5/2022 | Kuntz et al. |

FOREIGN PATENT DOCUMENTS

| | | | |
|---|---|---|---|
| DE | 19910201 | A1 | 9/2000 |
| DE | 60003165 | T2 | 4/2004 |
| DE | 102010050740 | A1 | 5/2012 |
| DE | 102018217018 | A1 | 4/2020 |
| EP | 1321282 | A1 | 6/2003 |
| EP | 1892078 | A1 | 2/2008 |
| EP | 2508329 | A1 | 10/2012 |
| EP | 3251821 | A1 | 12/2017 |
| TR | 201618336 | A2 | 6/2018 |
| WO | 2014123645 | A1 | 8/2014 |
| WO | 2015145407 | A1 | 10/2015 |
| WO | 2018028791 | A1 | 2/2018 |
| WO | 2018039402 | A1 | 3/2018 |
| WO | 2020069978 | A2 | 4/2020 |

OTHER PUBLICATIONS

International Search Report including Written Opinion for Application No. PCT/EP2019/076736, Dated Mar. 27, 2020, 17 pages.
International Search Report for Application No. PCT/EP2019/076736, Dated Mar. 27, 2020, 17 pages.

* cited by examiner

METHODS FOR PRODUCING A STRUCTURAL COMPONENT

CROSS-REFERENCE TO RELATED APPLICATIONS

The present application is a national phase entry under 35 U.S.C. § 371 of International Application No. PCT/EP2019/076736 filed on Oct. 2, 2019, which claims priority to German Patent Application No. 10 2018 217 017.7 filed on Oct. 4, 2018, the disclosures of which are incorporated herein by reference.

The present invention relates to a method of manufacturing a structural component, in particular a structural component having a curved or double-bent shape or form.

Structural components made of fiber composite material with a large areal extension are used in particular in the field of aircraft and spacecraft construction. In addition, structural components frequently comprise a dome-shaped or otherwise spherical appearance that is curved in at least two directions. Curved components are used in aircraft construction, e.g. as pressure bulkheads or fuselage shells.

For the manufacture of such structural components, typically a plurality of mat-shaped semi-finished fiber products are first stacked to form a laminate or layered structure. The semi-finished fiber products can be in the form of fiber mats pre-impregnated with a matrix material. The laminate structure formed is then shaped and the matrix material is cured.

DE 10 2010 050 740 A1 describes a method of manufacturing a structural component, wherein a plurality of semi-finished layers made from a fiber-reinforced thermoplastic material are stacked and selectively joined together at certain points to fix a position of the semi-finished layers relative to one another.

US 2005/0035115 A1 describes a process for the production of fiber composite components wherein a layered structure comprising reinforcing fiber layers embedded in thermoplastic matrix material is accommodated between heating mats in the form of metal foils. In a closed cavity of a compression tool, the layered structure between the heating mats is inductively heated to a forming temperature above the melting point of the matrix material and shaped together with the heating mats by means of a pressurized fluid. A similar process is described in U.S. Pat. No. 5,591,369 A.

An aspect of the present invention may provide an improved method, in particular improved with respect to process efficiency, for manufacturing a structural component from a fiber-reinforced thermoplastic material.

According to a first aspect of the invention, a method of manufacturing a structural component is provided. In a first step, a layered structure preformed according to a shape of the structural component to be manufactured is provided, comprising a plurality of layers each having reinforcing fibers embedded in a thermoplastic matrix material. The individual layers are present in particular in a non-consolidated or not fully consolidated or not pre-consolidated state, i.e. as discrete layers or only partially bonded layers whose bond does not yet have the quality required for the final component. In particular, such a layered structure may have an air content of greater than or equal to 2.5 percent by volume. The layered structure is heated in a cavity formed between a contour surface and an abutment member to a first temperature greater than a melting point of the thermoplastic matrix material. Further, while applying a compression pressure, cooling of the layer structure in the cavity to a solidification temperature, which is, for example, lower than the melting point of the thermoplastic matrix material, is performed. Thereby the thermoplastic material of the layer structure solidifies. According to the invention, the compression pressure is generated by producing, by means of a first magnet device, a magnetic field directed transversely, preferably perpendicularly, to the contour surface, which magnetic field is coupled into a magnetizable material associated with the abutment member and/or into a magnetizable material associated with the contour surface in such a way that the layer structure is subjected to the compression pressure by the contour surface and the abutment member. For example, the abutment member and/or the contour surface may include or be formed of a magnetizable material, whereby the magnetic field draws the abutment member and the contour surface together relative to each other. Alternatively, it is also possible that the magnetic material is coupled to or attached to the contour surface and/or the abutment member and is thereby associated with the contour surface and/or the abutment member. Alternatively, a magnetic field directed transversely, preferably perpendicularly, to the contour surface is generated by the first magnet device, which magnetic field interacts with a magnetic field generated by a second magnet device associated with the abutment member or the contour surface, such that the layer structure is subjected to the compression pressure by the contour surface and the abutment member. The first magnet device may be a permanent magnet or an electromagnet. The second magnet device may be a permanent magnet or an electromagnet, regardless of the design of the first magnet device.

One of the ideas of the invention thus consists in carrying out a consolidation of the layered structure formed from thermoplastic semi-finished fiber composite products between a contour surface and an abutment member, which press the layers of the layered structure together, the compression pressure required for this being generated by means of a magnet device, e.g., in the form of one or a plurality of electromagnets or permanent magnets, which induces a magnetic field in a magnetic material of a part forming the contour surface and/or of the abutment member, which field causes the contour surface and the abutment member to be pressed against the layer structure. This reduces the amount of tooling required. In particular, a formation of a magnetic field extending through the cavity in which the layer structure is located is achieved, resulting in a very uniform pressure distribution. According to the invention, this can also be achieved by creating an interaction between a magnetic field generated by a first magnet device directed transversely to the contour surface and a magnetic field generated by a second magnet device associated with the abutment member or the contour surface, by which interaction the contour surface and the abutment member are pressed against the layer structure.

According to one embodiment of the method, the first magnet device may be arranged at the abutment member or the contour surface, wherein the magnetic field generated by the first magnet device extends through the layered structure. Accordingly, the first magnet device may be arranged opposite the magnetizable material or opposite the second magnet device. Thus, a magnetic field is generated which is spatially highly concentrated but distributed over the contour surface or the abutment member in a planar manner and which generates the compression pressure. By the extension of the magnetic field through the layered structure, a favorable force flow is achieved and a planar distribution of the compression pressure is improved.

According to one embodiment of the method, the abutment member and/or the contour surface may contain an inductively heatable material and the heating of the layered structure may be carried out by inductive heating. Alternatively, the heating may also be carried out by means of infrared radiation. Inductive heating, i.e., heating by generating alternating magnetic fields by means of an alternating electrical voltage, offers the advantage that the contour surface and/or the abutment member itself can be heated very quickly and thus can virtually act as a heating device. Therefore, efficient and rapid heating of the cavity can be achieved. The abutment member and/or the contour surface may in particular comprise a material which is inductively heatable, in particular an electrically conductive material, e.g., a metal material such as mild steel, stainless steel, invar steel, aluminum, copper or the like, a semiconductor material, a ferrimagnetic ceramic material or the like. Infrared radiation can be advantageously generated with little design effort.

According to a further embodiment of the method, it is provided that the cavity is evacuated by means of a vacuum device. By generating a vacuum in the cavity, air that may be present between or in the layers of the layered structure is extracted from the layered structure. This prevents pore formation in the structural component and thereby increases the mechanical strength of the structural component. Furthermore, the vacuum can assist in generating the compression pressure. This further accelerates the process.

If the cavity is evacuated, the abutment member may, for example, be formed by a vacuum film, i.e. an elastically or plastically deformable film extending in an area, e.g., made of a silicone material or a similar material.

According to a second aspect of the invention, a method of manufacturing a structural component is provided. In this case, a layered structure preformed according to a shape of the structural component to be produced is provided, comprising a plurality of layers each having reinforcing fibers embedded in a thermoplastic matrix material. The individual layers are present in particular in a non-consolidated or non-pre-consolidated state, i.e., as discrete layers. Such a layered structure may in particular comprise an air content of greater than or equal to 2.5 percent by volume. The layered structure is heated in a cavity formed between a contour surface and an abutment member to a first temperature which is greater than a melting point of the thermoplastic matrix material, wherein the abutment member and/or the contour surface include an inductively heatable material and the heating is carried out inductively, i.e., by generating alternating magnetic fields by means of an alternating electrical voltage which induce eddy currents in the inductively heatable material. In a further step, a compression pressure is applied by evacuating the cavity and cooling the layered structure in the cavity to a solidification temperature which is, for example, lower than the melting point of the thermoplastic matrix material.

This aspect of the invention is based on the idea of achieving rapid heating of the cavity by inductive heating of the abutment member and/or of a part providing the contour surface, and thus accelerating the method. The abutment member and/or the contour surface therefore contain a material which is inductively heatable, in particular an electrically conductive material, e.g., a metal material such as mild steel, stainless steel, invar steel, aluminum, copper or the like, a semiconductor material, a ferrimagnetic ceramic material or the like. Since the compression pressure is generated exclusively by vacuum or evacuation of the cavity, a structurally simple mold design can be realized, which advantageously does not require a pressing tool.

According to one embodiment of the method, the abutment member may be formed by a vacuum film, i.e., an elastically or plastically deformable film extending over an area, e.g., made of a silicone material or a similar material.

The embodiments described below may relate both to a method according to the first aspect of the invention and to a method according to the second aspect of the invention.

According to one embodiment, it is provided that the abutment member is formed by a second mold plate. Accordingly, this is designed as a plate that is planar extending and that is adapted to the shape of the component to be produced, e.g., a curved metal plate. Compared to solid presses, the mold plate has a low heat capacity but still offers a certain mechanical stability. Thus, on the one hand, the cavity can be heated quickly and with low energy input. Furthermore, if the compression pressure is applied by means of magnetic force, a particularly good two-dimensional distribution of the compression pressure can be achieved.

According to a further embodiment, it may be provided that a seal is arranged between the first mold plate and the contour surface, which hermetically seals the cavity. The seal can, for example, be formed from a silicone material or another elastic, sealing material. The hermetic seal facilitates the application of the consolidation pressure.

According to a further embodiment, at least one stiffening profile or reinforcing profile comprising a thermoplastic material can be placed on a layer of the layered structure opposite to the contour surface, the stiffening profile being pressed against the layered structure in the cavity by means of the abutment member. The stiffening profile is pressed against the layered structure when the compression pressure is applied. During heating to the first temperature, the thermoplastic material of the stiffening profile is also at least partially melted, so that a material joint is created between the layered structure and the stiffening profile. Since this takes place simultaneously with consolidating, the method is further accelerated.

According to a further embodiment, the contour surface is provided by a first surface of a mold half. The mold half has a surface section that forms the contour surface and a base section that supports or carries this surface section. The base section can be designed in particular in the form of a block or as a supporting frame. This provides a particularly dimensionally stable contour surface, which makes it easier to lay down the layered structure, e.g., with regard to the positional tolerance of the individual layers relative to one another.

Alternatively, the contour surface can also be provided by an inner surface of a first mold plate which is supported by the first mold half. The first mold plate is designed, similar to the second mold plate, as a flatly extending, e.g., curved metal plate adapted to the shape of the component to be produced. A rear surface of the first mold plate opposite to the inner surface is supported by the base portion of the mold half. The separation of the mold half and the first mold plate offers the advantage that the heat capacity of the parts forming the cavity is further reduced, so that the cavity can be heated and cooled quickly and with low energy input, and the mold half need not have such a large temperature resistance. Further, this allows the base section or mold half as a whole to be made of a low-cost plastic material or low-cost metal and still apply the compression pressure using magnetic force, further reducing tool costs. Optionally, a thermally insulating layer is arranged between the first mold plate and the mold half. This has the advantage that the mold half is exposed to lower temperature fluctuations and consequently deforms less due to thermal expansion. For example, if the abutment member is formed by a first mold plate, the above-mentioned seal can be arranged between the first mold plate and the second mold plate providing the contour surface. This provides a hermetically sealed cavity between two thin mold plates, which can be evacuated in a simple and efficient manner. This improves, for example, the quality of the manufactured component, since possible air inclusions are prevented and, if the compression pressure is applied by evacuating the cavity, the application of the compression pressure is additionally facilitated.

According to a further embodiment of the method, the individual layers of the layered structure each comprise at least one semi-finished product having a plurality of prepreg tapes extending along one another, which each have unidirectionally arranged reinforcing fibers embedded in thermoplastic matrix material, and a plurality of connecting strands containing a thermoplastic material. In particular, the thermoplastic material of the connecting strands may be the same thermoplastic material as the matrix material contained in the prepreg tapes, or at least have a similar composition. The connecting strands and the prepreg tapes are joined to form a textile sheet in which each of the connecting strands crosses a plurality of the prepreg tapes, the connecting strands and the prepreg tapes being bonded to each other in a material joint along a joining line in a first end region of the sheet and in a second end region of the sheet opposite thereto, respectively. Accordingly, the entire layer may be formed by such a semi-finished product or may comprise a plurality of such semi-finished products. to provide a semi-finished product in the form of a textile sheet structure formed from prepreg tapes having unidirectional fibers and connecting strands comprising a thermoplastic material. The textile structure, i.e., a structure of intersecting strands, offers the advantage that the semi-finished product has anisotropic deformation properties. In particular, the textile structure allows the prepreg tapes to slide along each other, which prevents wrinkling during forming. Wrinkling is further prevented by the fact that a material joint between the strands, i.e., a material joint between prepreg tapes and thermoplastic connecting strands, is provided only along connecting lines located opposite one another, the prepreg tapes and the connecting strands being able to slide along one another or not being bonded at the remaining crossing points. This prevents fraying or disintegration of the semi-finished product, while the sliding of the individual tapes relative to one another is impeded as little as possible. The unidirectional thermoplastic prepreg tapes are elongated, single-layer tape material in which continuous reinforcing fibers extending in only one direction are embedded in a thermoplastic matrix material. Such prepreg tapes offer the advantage that they are easily deformable but less susceptible to the formation of ondulations.

According to one embodiment, the connecting strands each comprise a first end portion and a second end portion located opposite thereto, the first and second end portions each projecting beyond the connecting lines. A respective layer of the layered structure is formed by thermoplastically joining at least the first end sections of the connecting strands of a first semi-finished product to prepreg tapes of a respective further semi-finished product. Optionally, the second end sections of the connecting strands of the other semi-finished product may also be thermoplastically joined to prepreg tapes of the first semi-finished product. This makes it possible to produce large planar layers in a simple manner A welding process, such as ultrasonic welding, can be used for thermoplastic joining, for example.

According to a further embodiment of the method, it is provided that the layers of the layered structure are formed by semi-finished products comprising a plurality of prepreg tapes each having unidirectionally arranged reinforcing fibers embedded in a thermoplastic matrix material, wherein the prepreg tapes are arranged in a multiaxial fabric comprising a plurality of superimposed layers of prepreg tapes, wherein the prepreg tapes within a layer run parallel to each other, and wherein the layers are joined relative to each other at discrete locations. Preferably, the layers are joined at discrete locations arranged in a periodically repeating pattern. Generally, the layers may be sewn, entangled or interwoven, for example, by means of a plurality of connecting strands comprising a thermoplastic resin material 30. Accordingly, a multilayer semi-finished product is used to form the layered structure, wherein the individual layers are formed from parallel prepreg strips and the individual layers are connected only selectively by the connecting strands. For example, joining positions can be provided along parallel lines. Due to the merely punctual connection of the layers and the parallel extension of the prepreg tapes and thus of the reinforcing fibers within the individual layers, the individual layers can slide relative to one another as well as the fibers within the individual layers can slide relative to one another, thus preventing wrinkling.

According to a further embodiment of the method, the layer structure is prepared by depositing prepreg tapes by means of a depositing head, the individual prepreg tapes being fixed in their position relative to one another during depositing. In particular, the prepreg tapes can each have unidirectionally arranged reinforcing fibers embedded in a thermoplastic matrix material. Accordingly, forming the layers takes place by means of an AFP method, where "AFP" is an abbreviation for the term "Automated Fiber Placement". For this purpose, the laydown head can have, for example, a roller or roll which places the prepreg tapes against the contour surface or against an already formed layer. An actuator, e.g., in the form of a manipulator of an industrial robot, can be provided to move the roller. Optionally, in this process the contour surface is heated to a deposition temperature which is below the melting temperature of the thermoplastic matrix material. For Fixing the prepreg tapes, they can be heated locally to melting temperature by the depositing head at the moment of deposition, such that the individual prepreg tapes fuse together locally after deposition. The optional heating of the contour surface has the effect that the temperature difference the depositing head has to generate is reduced in an advantageous manner and that thermal stresses in the prepreg tapes are prevented.

According to a further embodiment of the method, the layer structure is formed such that the reinforcing fibers extend along one direction within a respective layer and in different directions in different layers. For example, the layers are stacked on top of each other such that the prepreg tapes or the reinforcing fibers of each two adjacent layers or plies extend in different directions. This improves the mechanical strength of the structural component.

According to another embodiment of the method, the contour surface has a curved geometry.

As used herein, a "curved component" or "curved shape" is generally understood to mean a geometric body having at least a first surface and a second surface oriented opposite thereto, the first and second surfaces each being curved in at least two directions. In particular, this may include geometries that cannot be unwound onto a plane. For example, a curved body is understood herein to mean an at least partially dome-shaped, spherical, parabolic, or bowl-shaped body.

A vertex of the curved shape of the component may be given, for example, by the areal centroid of one of the surfaces forming the curved shape of the body. In particular, the vertex may be located on an intersection of symmetry lines of the curved shape.

With respect to directional indications and axes, in particular directional indications and axes relating to the course of physical structures, it is understood herein by a course of an axis, of a direction or of a structure "along" another axis, direction or structure that these, in particular the tangents resulting in a respective location of the structures, each run at an angle of less than or equal to 45 degrees, preferably less than 30 degrees, and in particular preferably parallel to one another.

With respect to directional indications and axes, in particular directional indications and axes relating to the course of physical structures, it is understood herein that a course of an axis, of a direction or of a structure "transversely" to another axis, direction or structure means that these, in particular the tangents resulting in a respective location of the structures, each extend at an angle of greater than or equal to 45 degrees, preferably greater than or equal to 60 degrees, and in particular preferably perpendicular to one another.

Reinforcing fibers herein may be generally filamentary or filament piece fibers, such as carbon, glass, ceramic, aramid, boron, mineral, natural, or plastic fibers, or mixtures thereof.

A "melting point" or a "melting temperature" is understood herein in relation to a thermoplastic material as a temperature above which the material is in a flowable, viscous state. Above the melting temperature, a component of thermoplastic material can be materially joined, in particular fused, with a further component of thermoplastic material which is also present above the melting temperature.

Figure 2:
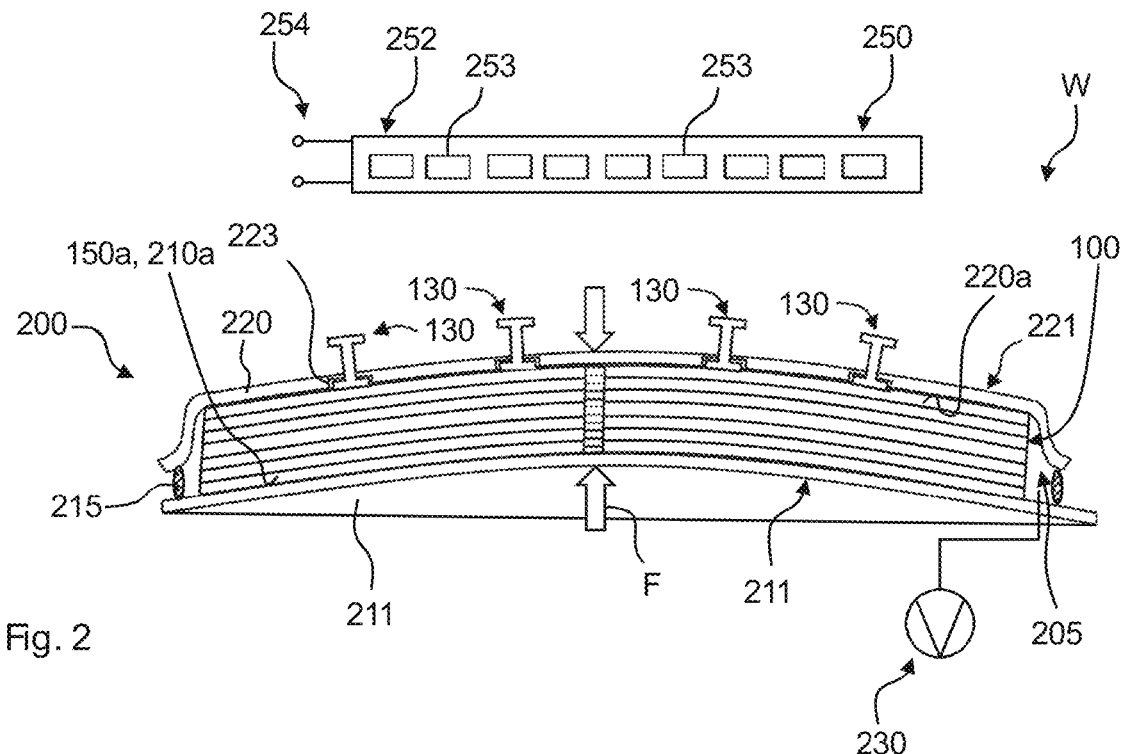
Figures 3, 4:
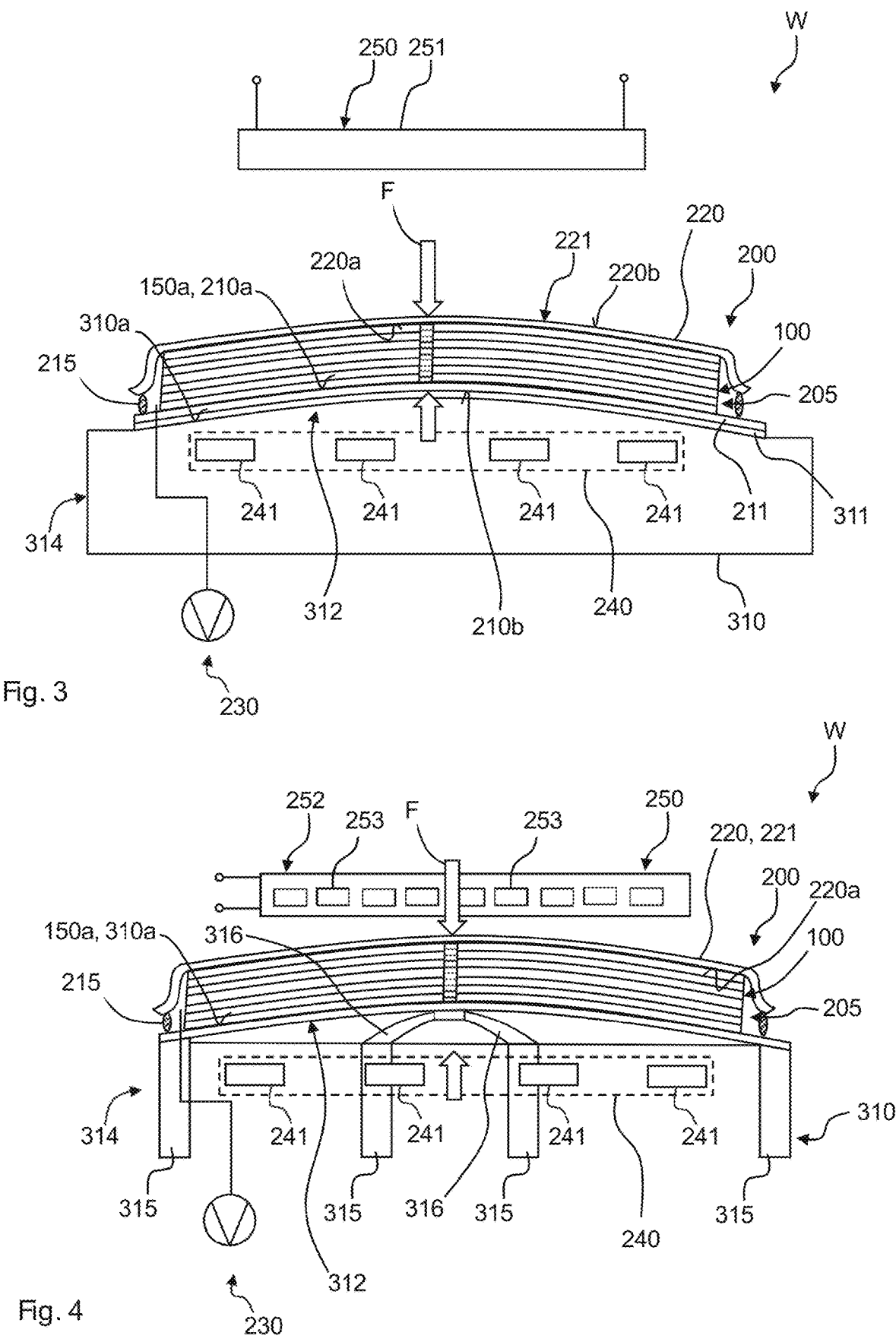
Figures 5, 6, 7, 8, 9, 10:
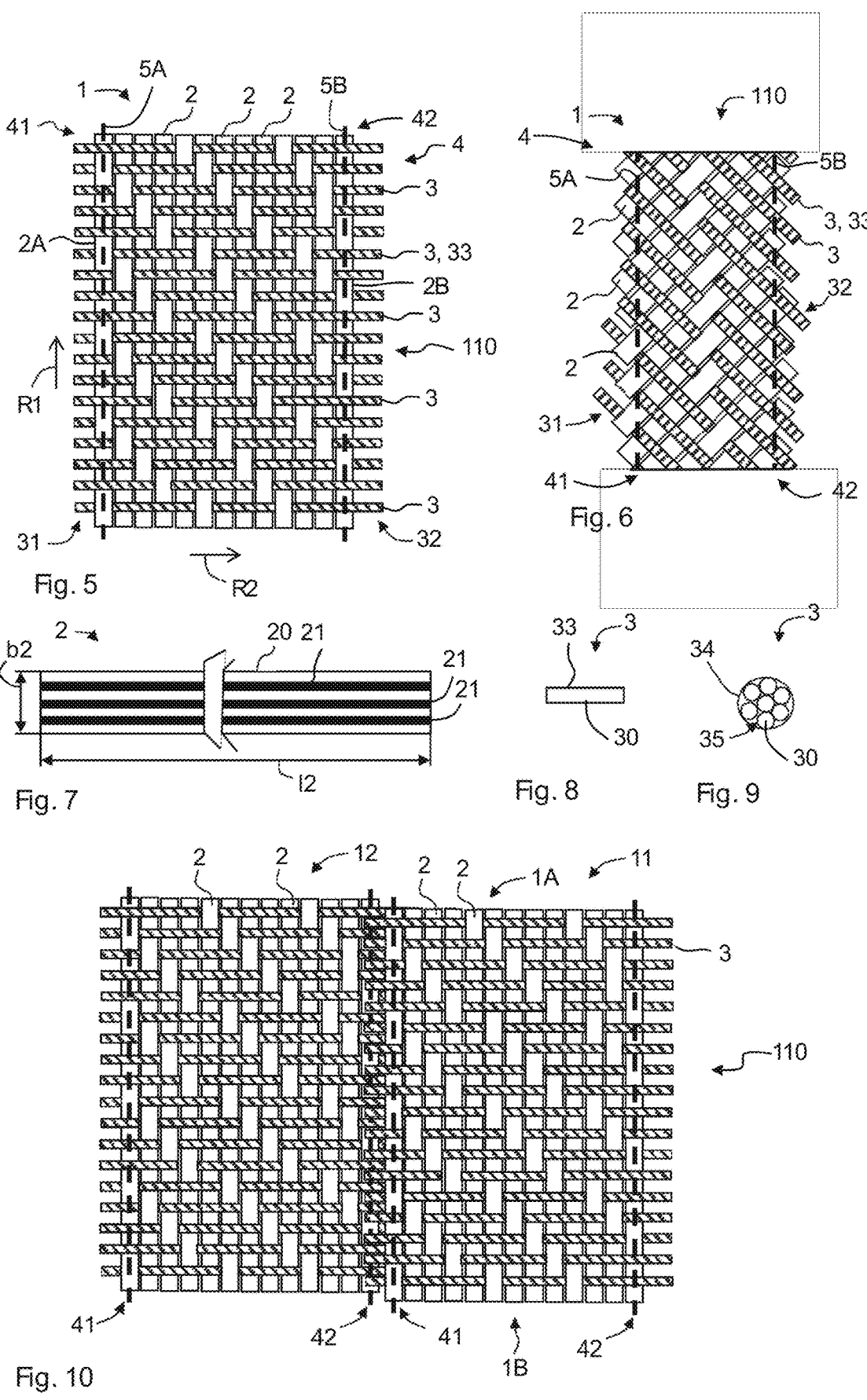
Figure 11:
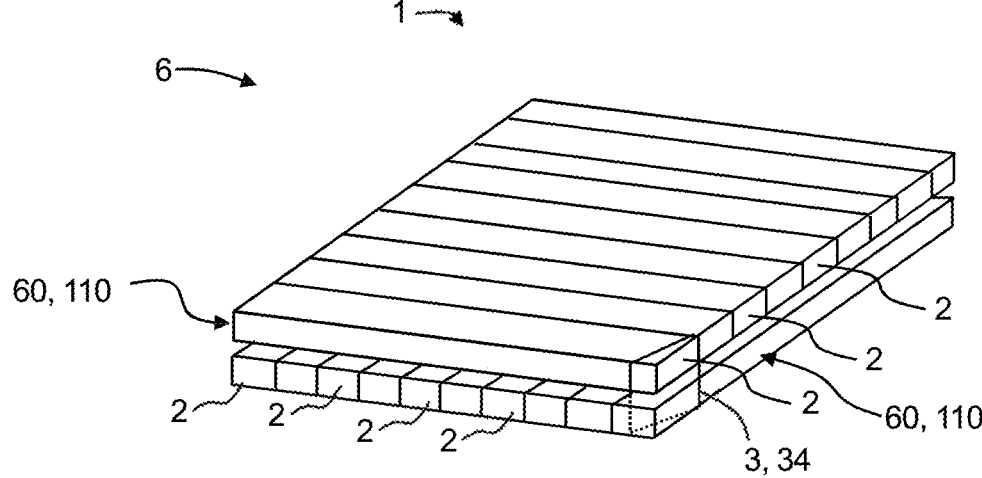
Figure 12:
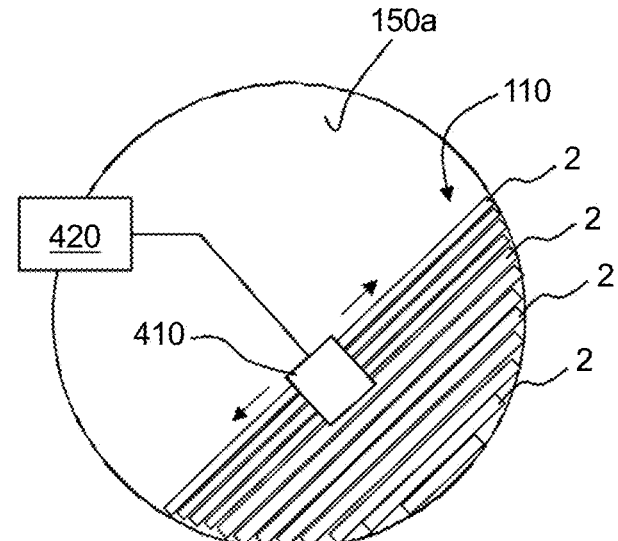
Figure 13:
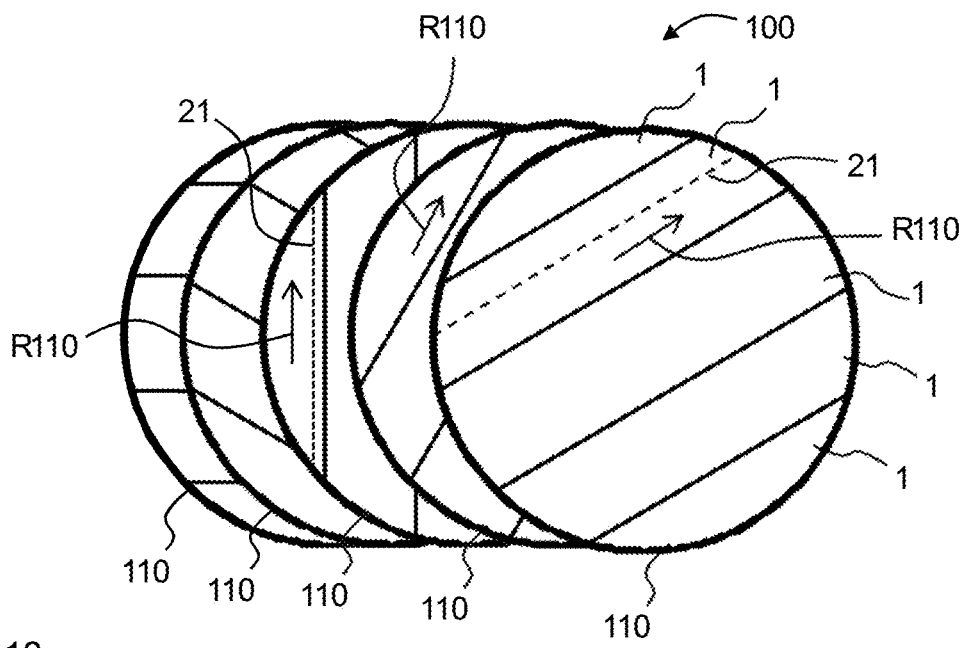
Figure 14:
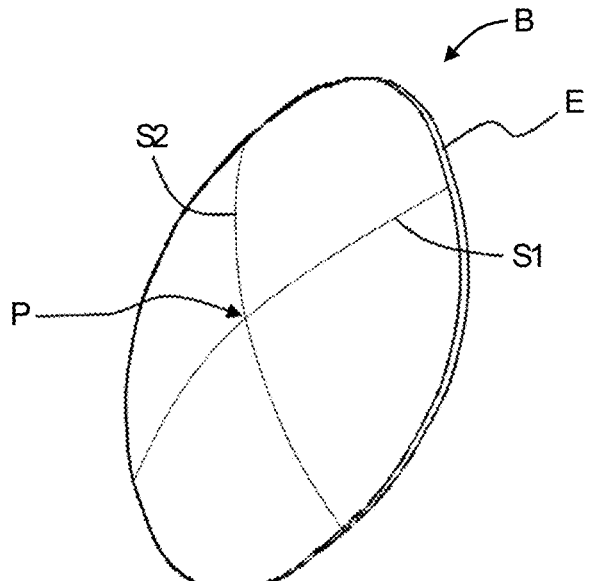
Figure 15:
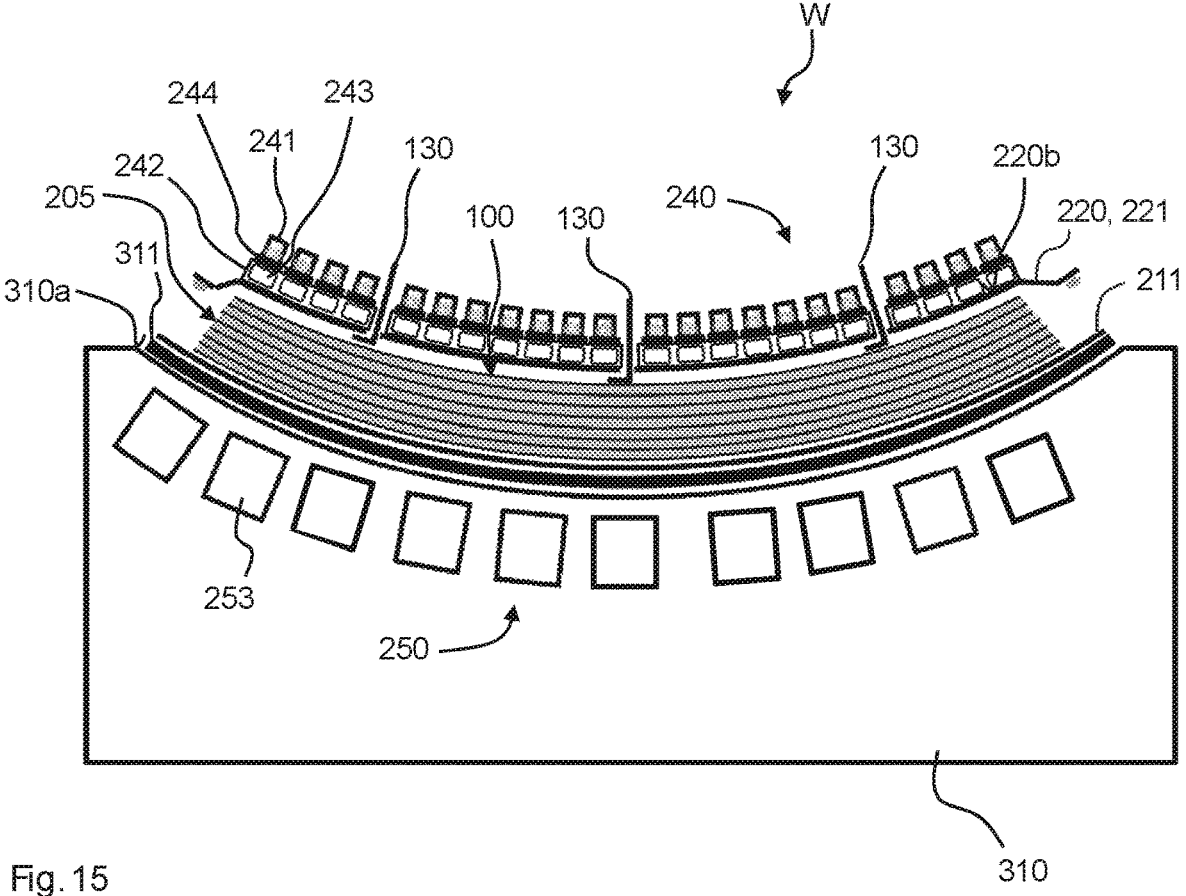
Figure 15A:
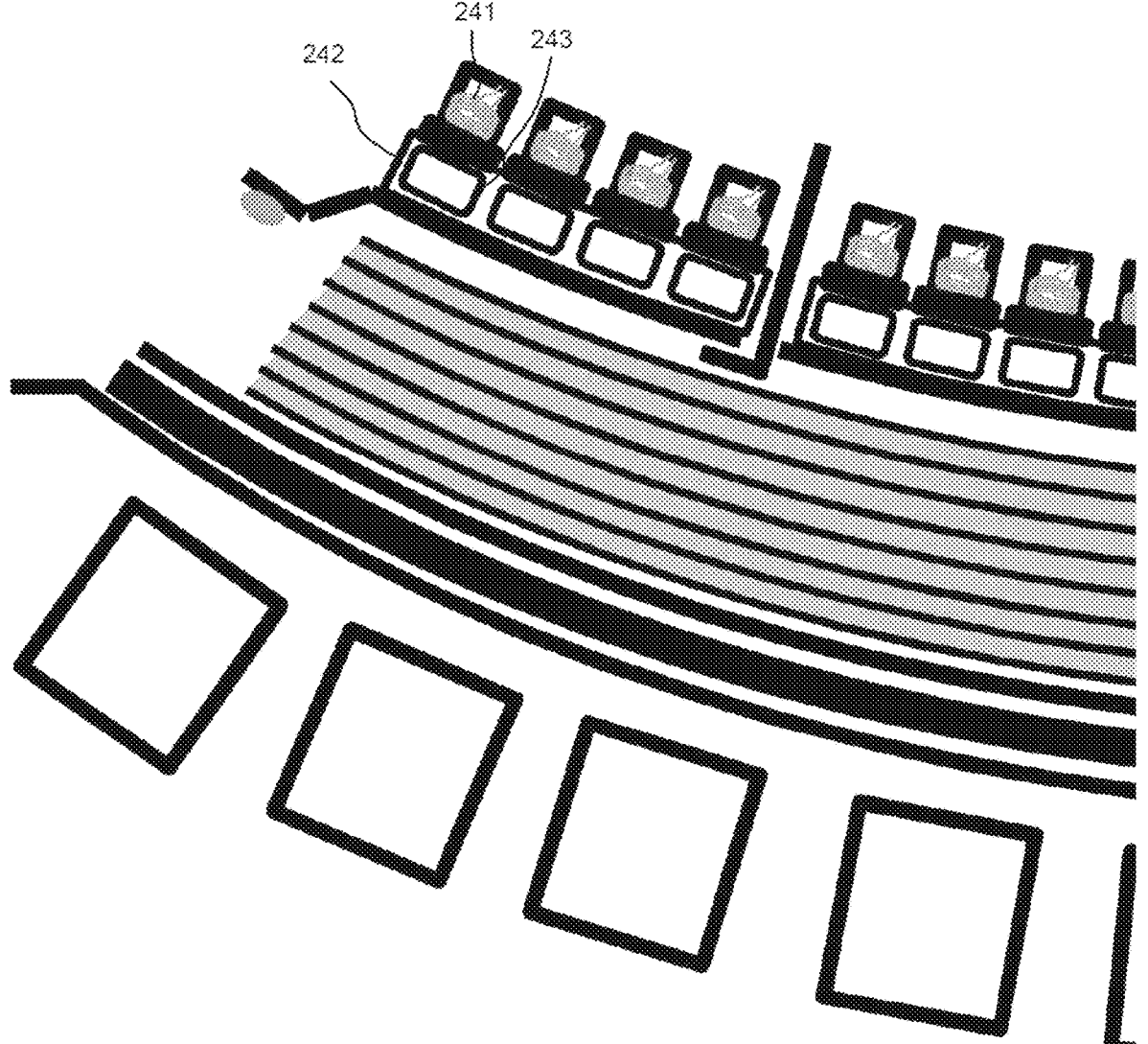

The invention is explained below with reference to the figures in the drawings. From the figures show:

FIG. 1 a schematic sectional view of a layered structure with multiple layers in an initial state of a method according to an exemplary embodiment of the present invention FIG. 2 a sectional view of a layered structure disposed in a cavity during a method according to an exemplary embodiment of the present invention;

FIG. 3 a sectional view of a layered structure arranged in a cavity during a method according to a further exemplary embodiment of the present invention;

FIG. 4 a sectional view of a layered structure arranged in a cavity during a process according to a further exemplary embodiment of the present invention;

FIG. 5 a top view of a semi-finished product for use in a method according to an exemplary embodiment of the present invention;

FIG. 6 a top view of a further semi-finished product for use in a method according to an exemplary embodiment of the present invention;

FIG. 7 a schematic sectional view of a prepreg tape for use in a method according to an exemplary embodiment of the present invention;

FIG. 8 a schematic sectional view of a connecting strand of a semi-finished product for use in a method according to an embodiment of the present invention;

FIG. 9 a schematic sectional view of a connecting strand of a semi-finished product for use in a method according to an embodiment of the present invention;

FIG. 10 a top view of a layer for generating a layer structure for a method according to an exemplary embodiment of the present invention, wherein the layer is formed from two semi-finished products according to FIG. 5;

FIG. 11 a schematic partial sectional view of a semi-finished product for use in a method according to an exemplary embodiment of the present invention;

FIG. 12 A formation of a layer of a layered structure according to an exemplary embodiment of a method of the present invention;

FIG. 13 a schematic exploded view of a layered structure comprising a plurality of layers for use in a process according to an exemplary embodiment of the present invention;

FIG. 14 a perspective view of a structural component produced by means of a method according to an exemplary embodiment of the present invention;

FIG. 15 a sectional view of a layered structure disposed in a cavity during a process according to a further exemplary embodiment of the present invention;

FIG. 15A an enlarged detail of FIG. 15; and

Figure 16:
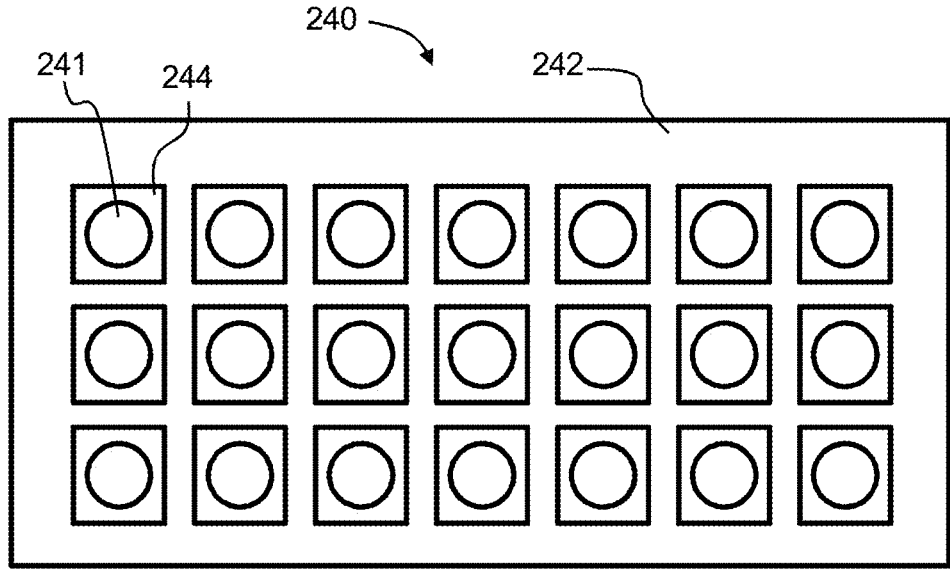

FIG. 16 a top view of the arrangement shown in FIG. 15.

In the figures, same reference signs denote identical or functionally identical components, unless otherwise indicated.

FIG. 14 shows, by way of example, a curved structural component B in the form of a pressure dome for an aircraft (not shown). In particular, the structural component B may have a circular peripheral edge E. As shown in FIG. 14, the structural component B may, for example, be dome-shaped or cupola-shaped and thus curved in several curvature directions. In FIG. 14, a vertex P of the curved shape of the structural component B is drawn in, which is given by an intersection of symmetry lines S1, S2 of the structural component B.

FIG. 1 shows a sectional view of a layered structure 100 as a starting product of a method for manufacturing a structural component B, e.g., the structural component B shown in FIG. 14. The layered structure 100 comprises a plurality of, e.g., at least two, layers 110. The layers 110 are generally formed as planar extending layers, each having reinforcing fibers 21 (not shown in FIG. 1) embedded in a thermoplastic matrix material 20 (not shown in FIG. 1).

As exemplarily and schematically shown in FIG. 1, the layers 110 are arranged lying on top of each other or stacked on top of each other and can, in particular, lie flat against each other. As is further shown schematically in FIG. 1, the layered structure 100 as a whole is preformed, i.e., geometrically deformed in such a way that the layered structure 100 has a shape or form of the structural component B to be produced. The layered structure 100 exemplarily shown in FIG. 1 has a curved, in particular dome-shaped or cupola-shaped form. This layered structure 100 can be used, for example, to produce the structural component B shown in FIG. 14.

In the layered structure 100 shown as an example in FIG. 1, the individual layers 110 are thermoplastically joined, for example by ultrasonic welding, at a first joining point 120, which is located in the region of the vertex P of the curved shape to be produced. For example, the connection point can be selected in such a way that, in the corresponding region, no more displacement or only a very slight displacement of the layers 110 relative to one another is necessary during a subsequent forming process. Alternatively or additionally, the layers 110 may also be thermoplastically joined at further joints 121 away from the vertex P, e.g. likewise by ultrasonic welding, as shown by way of example in FIG. 1.

The layered structure 100 may be formed generally by sequential depositing and forming of the individual layers 110, with the depositing and forming optionally occurring simultaneously. For example, the individual layers 110 may be stacked as planar semi-finished products 1 and formed. Examples of planar semi-finished products 1 are explained in more detail below with reference to FIGS. 5 to 11. Alternatively, the individual layers 110 may be produced by depositing a plurality of prepreg tapes 2, for example by means of an AFP process, which is explained below by way of example with reference to FIG. 12.

As shown in FIGS. 5, 6 and 11, the semi-finished product 1 comprises a plurality of prepreg tapes 2 and a plurality of connecting strands 3.

FIG. 7 shows, by way of example, a schematic, interrupted sectional view of a prepreg tape 2. As can be seen in FIG. 7, the prepreg tape 2 has a plurality of reinforcing fibers 21 extending in one direction or unidirectionally. The reinforcing fibers 21 may be in the form of fiber bundles, for example. As further shown in FIG. 7, the reinforcing fibers 21 are embedded in a thermoplastic matrix material 20. As shown in particular in FIGS. 5, 6 and 11, the prepreg tapes 2 are realized as narrow, strip-shaped tapes. As shown in FIG. 7, the prepreg tapes 2 may have a width b2, e.g., in a range between 1 mm and 15 mm, and a length 12, e.g., in a range between 0.5 m and 100 m.

FIGS. 8 and 9 show exemplary possible designs of the connecting strands 3. In particular, the connecting strands 3 can each be made of a thermoplastic plastics material or comprise a thermoplastic plastics material. In FIG. 8, an exemplary reinforcing strand 3 is shown in cross-section, which is implemented as a foil tape 33 consisting of thermoplastic material 30. As exemplified in FIG. 8, the foil tape 33 may be realized with a rectangular cross-section.

In FIG. 9, an exemplary cross-section of a reinforcing strand 3 is shown, which is formed as a thread 34 consisting of thermoplastic material 30. As shown schematically and by way of example in FIG. 9, the thread 34 may be formed from a plurality of twisted filaments 35 forming an approximately circular cross-section of the thread 34. Optionally, the reinforcing strands 3 contain the same thermoplastic resin material used as the matrix material of the prepreg tapes.

In the semi-finished product 1 shown as an example in FIG. 5, the prepreg tapes 2 and the connecting strands 3 are interwoven with one another and thus form a textile, single-layer sheet structure 4. As exemplified in FIG. 5, the connecting strands 3 extend transversely to the prepreg tapes 2, each of the connecting strands 3 crossing several of the prepreg tapes 2. In particular, each connecting strand 3 runs in sections on opposite sides of the prepreg tapes 2. The prepreg tapes 2 run along each other and do not cross each other within the sheet structure 4. In FIG. 5, the connecting strands 3 are shown as foil tapes 33 by way of example.

As can be seen in FIG. 5, the prepreg tapes 2 extend in a first direction R1 and the connecting strands 3 extend in a second direction R2 transverse to the first direction R1. In order to prevent fraying of the fabric, in FIG. 5 with respect to the second direction R2 an outermost first prepreg tape 2A and an outermost second prepreg tape 2B, which is located opposite to the first prepreg band, are materially joined to the connecting strands 3. As exemplarily shown in FIG. 5, the connecting strands 3 are materially joined to the first prepreg tape 2A in the region of a first end portion 31 and to the second prepreg tape 2A in the region of a second end portion 32, which is located opposite to the first end portion 31 with respect to the second direction R2. The first and second prepreg tapes 2A, 2B respectively define opposite edges of the textile sheet structure 4. As exemplified in FIG. 5, in particular each of the connecting strands 3 may be materially joined to the first and second prepreg tapes 2A, 2B. Generally, the connecting strands 3 and the prepreg tapes 2 are materially joined to each other in a first end region 41 of the sheet structure 4 and in a second end region 42 of the sheet structure 4 opposite thereto, respectively along connecting lines 5A, 5B. In FIG. 5, the connecting lines 5A, 5B each run along the first direction R1 and along the first and second prepreg tapes 2A, 2B, respectively. The material joint can be produced by ultrasonic welding, for example.

As further shown in FIG. 5, it may be provided that the first end portion 31 of the connecting strands 3 protrudes or projects beyond the first prepreg tape 2A and the second end portion 32 of the connecting strands 3 protrudes or projects beyond the second prepreg tape 2B with respect to the second direction R2, thus forming a projecting tab. Generally, it may be provided that the end portions 31, 32 of the connecting strands 3 each project beyond the connecting lines 5A, 5B.

In the case of the semi-finished product 1 shown as an example in FIG. 6, the prepreg tapes 2 and the connecting strands 3 are interwoven with one another and thus form a textile, single-layer sheet structure 4. As shown schematically in FIG. 6, the connecting strands 3 run transversely to the prepreg tapes 2, each of the connecting strands 3 crossing several of the prepreg tapes 2. In particular, each connecting strand 3 runs section wise on opposite sides of the prepreg tapes 2. Thereby, within the sheet structure 4, the prepreg tapes 2 can also cross each other. In FIG. 6, the connecting strands 3 are shown as foil tapes 33 as an example.

As exemplarily shown in FIG. 6, the connecting strands 3 are each materially joined to one of the prepreg tapes 2 in the region of a first end portion 31 and in the region of a second end portion 32, which is located opposite to the first end portion 31 with respect to the second direction R2. As a result, the connecting strands 3 and the prepreg tapes 2 are materially joined to one another in a first end region 41 of the sheet-like structure 4 and in a second end region 42 of the sheet-like structure 4, which is located opposite thereto, in each case along a connecting line 5A, 5B. In FIG. 6, it is shown by way of example that the connecting lines 5A, 5B each run along crossing points of the prepreg strips 2 and the connecting strands 3 and obliquely to a longitudinal extent of the prepreg strips 2 and the connecting strands 3. The material joint can be produced by ultrasonic welding, for example.

As further shown in FIG. 6, for one or more of the connecting strands 3, the first end portion 31 may protrude beyond the first connecting line 5A and the second end portion 32 may protrude beyond the second connecting line 5B to form a protruding tab.

The semi-finished products 3 shown by way of example in FIGS. 5 and 6 allow the prepreg tapes to slide against each other because of their fabric structure, thus reducing the risk of wrinkling when the semifinished product is formed.

FIG. 10 shows, by way of example, the production of a single layer 110 from several of the semi-finished products 1 shown in FIG. 5. To form the layer 110, first end sections 31 of the connecting strands 3 of a first semi-finished product 11 are first thermoplastically or materially joined to prepreg tapes 2 of a respective further semi-finished product 12, e.g. by ultrasonic welding. The second end sections 32 of the connecting strands 3 of the further semi-finished product 12 are further thermoplastically joined to prepreg tapes 2 of the first semi-finished product 11, for example also by ultrasonic welding. As shown in FIG. 10, the first end sections 31 of the connecting strands 3 of the first semi-finished product 11 overlap the outermost second prepreg tape 2B of the second semi-finished product 12, and the second end sections 32 of the connecting strands 3 of the first semi-finished product 12 overlap the outermost first prepreg tape 2A of the first semi-finished product 11. The semi-finished product 1 shown in FIG. 6 can be joined to further such semi-finished products 1 in the same way.

To provide the layered structure 100, multiple layers 110, as exemplified in FIG. 10, can be stacked on top of each other and formed. Optionally, the individual layers 110 can also be cut (not shown) to produce a desired peripheral shape. Of course, a semi-finished product 1, as shown in FIGS. 5 and 6, can also form a layer 110 in each case, if necessary after carrying out a cutting operation (not shown).

The semi-finished product 1 shown schematically as an example in FIG. 11 has a multilayer structure. The prepreg tapes 2 are arranged to form a flat multiaxial fabric 6, which comprises several superimposed layers 60 of prepreg tapes 2. As shown schematically in FIG. 11, the prepreg tapes 2 extend parallel to one another within a respective layer 60. In adjacent layers 60, the prepreg tapes 2 extend in different directions, e.g. transversely to each other. In FIG. 11, only two layers or plies 60 are shown for simplicity. The individual layers 60 are connected relative to one another at individual points or selectively, preferably at discrete points arranged in a periodically repeating pattern. For example, the layers 60 may be sewn together by means of the connecting strands 3 described above. This is shown in FIG. 11 in only a single location for clarity. As shown by way of example, the connecting strand 3 in each case wraps around two intersecting prepreg tapes 2 at a crossing point. The connecting strand 3 is preferably formed as a thread 34.

In the case of the semi-finished product 1 shown as an example in FIG. 11, the prepreg tapes 2 can slide within a layer 60 and the layers 60 can slide against each other, reducing the risk of wrinkling during forming of the semi-finished product 1.

To provide the layered structure 100, one or more semi-finished products 1 can be stacked on top of each other and formed, as exemplified in FIG. 11. Optionally, the semi-finished products 1 can also be cut (not shown) to produce a desired peripheral shape.

FIG. 12 schematically shows a providing of the layered structure 100 by depositing prepreg tapes 2 by means of a depositing head 410. This can also be referred to as AFP method, where "AFP" is an abbreviation of the term "Automated Fiber Placement". The prepreg tapes 2 can be designed in particular as exemplarily shown in FIG. 7 and already explained above. The depositing head 410 has one or more rollers (not shown) and is movable along a contour surface 150a by means of a movement device 420. The contour surface 150a can be formed in particular by a first surface 310a of a mold half 310 or by an inner surface 210a of a mold plate 211, which will be described in detail below. The movement device 420 is shown only symbolically as a block in FIG. 12 and can be formed, for example, by a manipulator arm of an industrial robot. The movement device 420 moves the depositing head 410 along predetermined movement paths along the contour surface 150a and the at least one roller places the prepreg tape 2, which is unrolled, for example, from a storage drum (not shown), against the contour surface 150a. The individual prepreg tapes 2 are laid down within a layer 110 parallel to each other or lying next to each other, as this is shown schematically in FIG. 12. Furthermore, the prepreg tapes 2 are fixed relative to one another in their layer 110, for example by locally heating the prepreg tapes 2 to a temperature that is greater than the melting temperature of the matrix material 20. This at least locally results in a material joint of the prepreg tapes 2. To form a further layer 110, prepreg tapes 2 are placed on an already formed layer 110 in the manner described.

FIG. 13 schematically shows an exploded view of a layered structure 100. As schematically shown in FIG. 13, the reinforcing fibers 21 within a layer 110 preferably extend along a direction R110. Furthermore, it may be provided that the reinforcing fibers 21 from adjacent layers 110 of the layered structure 100 extend in intersecting directions R110. In FIG. 13, only one reinforcing fiber 21 is shown symbolically as a dashed line in each of only two layers 110 for better clarity.

For producing the structural component B, the layered structure 100 is heated in a cavity 205 to a first temperature that is greater than a melting point of the thermoplastic matrix material 20 and cooled to a solidification temperature that is, for example, less than the melting point of the thermoplastic matrix material 20, while applying a compression pressure in the cavity 205, and thereby consolidated.

Generally, the cavity 205 is formed between a contour surface 150a and an abutment member 220, as shown schematically in FIGS. 2 to 4. The contour surface 150a generally has a geometry or shape corresponding to the shape of the structural component B. In FIGS. 2 to 4, the contour surface 150a is convexly curved and has a curved geometry for producing the structural component B exemplified in FIG. 14. FIG. 15 shows an example of a concavely curved contour surface.

FIG. 2 shows an example of a tool arrangement W, which has a first mold plate 211, which forms the contour surface 150a, and a second mold plate 221 as an abutment member 220. The abutment member 220 or the second mold plate 221 and the first mold plate 211 can be positioned relative to each other in a closed position, as exemplified in FIG. 2. In the closed position, a cavity 205 is formed between the contour surface 150a and an inner surface 220a of the abutment member 220 facing the contour surface 150a in the closed position. Optionally, a seal 215 may be disposed between the first and second mold plates 211, 221 to hermetically seal the cavity 205 in the closed position. Alternatively to the second mold plate 221, a vacuum film (not shown) may be provided as an abutment member 220.

The first mold plate 211 can optionally be supported by a mold half 310, as is the case with the mold arrangement W exemplarily shown in FIG. 3. Furthermore, the contour surface 150a can also be formed on a mold half 310 instead of on the first mold plate 211, as exemplarily shown in FIG. 4 for another tool arrangement W. As a result of this merely one-sided support of the cavity 205 or the first mold plate 211, an energy input for heating the layered structure and for cooling the layered structure during consolidation is very low, or the time required for these steps is reduced while the dimensional stability of the cavity 205 is high.

As can be seen in particular in FIGS. 2 and 3, the mold plates 211, 221 are each formed as flatly extending plate-shaped components having a substantially constant thickness. The first mold plate 211 has an inner surface 210a, which forms the contour surface 150a, and a rear area or back surface 210b located opposite to the inner surface 210a. The second mold plate 221 has an inner surface 220a, which can in particular be formed corresponding to the shape of the structural component B to be produced or complementary to the inner surface 210a of the first mold plate 211. The inner surface 220a of the second mold plates shown in FIGS. 2 to 4 shown is concavely curved and has a curved geometry. In particular, in FIGS. 2 and 3, the mold plates 211, 221 are dome-shaped. The mold plates 211, 221 may each be formed of a metal material such as stainless steel or invar steel.

FIGS. 3 and 4 each show tool arrangements with an optional mold half 310. Generally, the mold half 310 comprises a surface section 312 and a base section 314. The surface section 312 comprises a first surface 310a, which can be formed, for example, as a surface to be described in three dimensions. In the exemplary mold half 310 shown in FIG. 3, the first surface 310a serves to support the first mold plate 211. As can be seen in FIG. 3, the first surface 310a may be convexly curved and domed, for example. In the exemplary mold half 310 shown in FIG. 4, the first surface 310a of the mold half 310 forms the contour surface 150a on which the layered structure 100 is deposited. The first surface 310a thereby comprises a shape corresponding to the shape of the component B to be produced. In FIG. 4, the first surface 310a is thus convexly curved and domed.

The base section 314 carries or supports the surface section 312. The base section 314 can in particular be block-shaped or cuboid-shaped, as shown by way of example in FIG. 3. The surface section 312 and the base section 314 thereby can in particular be designed as a single piece. The base section 314 can also be implemented as a support frame or structure, as exemplarily shown in FIG. 4. In this case, the surface section 312 can be designed in particular in the form of a plate. The support structure 314 exemplified in FIG. 4 comprises a plurality of support feet 315, which are arranged around a circumference of the surface section 312 and attached thereto. Alternatively or additionally, the support structure 314 may have stiffening ribs 316 attached to a second surface 310b of the surface section 312 opposite to the first surface 310a.

On the basis of FIGS. 2 to 4, various methods for manufacturing the structural component B are described below.

In FIG. 2, the layered structure 100 is located in the cavity 205 formed between the mold plates 211, 221. In this case, the cavity 205 is hermetically sealed by means of the optional seal 215. In FIG. 2, the contour surface 150a is formed by the inner surface 210a of the first mold plate 211. The second forming plate 221 forms the abutment member 220. Alternatively, the abutment member 220 can also be formed by a vacuum foil (not shown).

Prior to closing the cavity 205, in an optional further method step, a plurality of reinforcing or stiffening profiles 130 were applied to a layer 110 of the layered structure 100 located opposite to the contour surface 150a, as schematically shown in FIG. 2. For example, the stiffening profiles 130 may have a double-T-shaped cross-section, as exemplified in FIG. 2, and include a thermoplastic plastics material. For example, the stiffening profiles 130 may be formed from a fiber reinforced thermoplastic material. Next, the first and second mold plates 211, 221 are brought to the closed position, as shown in FIG. 2. In this case, the second mold plate 221 is provided with recesses 223 through which a bridge of the stiffening profile 130 extends. For this purpose, the second mold plate 221 can, for example, be formed in two parts, a first part having the recesses 223 in the form of slots which are open on one side and are closed by a second part. Optionally, a seal (not shown) is arranged between the bridge and the respective recess. Alternatively, the stiffening profiles 130 may be inserted into enveloping bulges or recesses (not shown) of the second mold plate 221. This improves the tightness of the cavity 205. The stiffening profile 130 is generally pressed against the layered structure 100 in the cavity 205 by means of the abutment member 220.

In a further step, the cavity 205 is evacuated by means of a pump or vacuum device 230, which is fluidically conductively connected to the cavity 205. As a result, a force F is applied to the mold plates 211, 221, which pulls the mold plates 211, 221 together relative to each other, so that the layered structure 100 is subjected to a compression pressure and the optional stiffening profiles 130 are pressed against the layered structure 100. Evacuation further exhausts air that may be contained in the layered structure 100 from the layered structure.

In a further step, the layered structure 100 is heated in the cavity 205 to a first temperature greater than a melting point of the thermoplastic matrix material 20. This causes the matrix material 20 of the individual layers 110 of the layered structure 100 to melt. Furthermore, the thermoplastic material of the stiffening profile 130 is melted in an area of the stiffening profile 130 that is adjacent to the layered structure 100, thereby achieving a material joint between the stiffening profile 130 and the layered structure 100.

In FIG. 2, the heating is performed inductively. For this purpose, the abutment member 220 and/or the contour surface 150a contain an inductively heatable material, e.g., an electrically conductive material, which can be magnetic or magnetizable, for example. In particular, metal materials, such as mild steel, stainless or invar steel, aluminum or the like, semiconductor materials or ceramics may be suitable, e.g., ferrimagnetic ceramic materials. In FIG. 2, for example, the first or second mold plate 211, 221 or both mold plates 211, 221 may each be formed of stainless or invar steel. If the abutment member 220 is formed as a vacuum foil, it may also comprise a mesh of an inductively heatable material. If the contour surface 150a is formed by a first surface 310a of a mold part 310, as exemplified in FIG. 4, the mold part 310, in particular the surface portion 312 may have an inductively heatable material, or may be formed from the same. For example, it is conceivable that the abutment member 220 and/or the part forming the contour surface 150a comprises a non-inductively heatable carrier material, e.g., a plastic material, in which inductively heatable particles or structures, e.g., a mesh, are embedded. As shown schematically in FIG. 2, a heating device 250 in the form of an induction heating device 252 is provided for inductive heating, which comprises one or more induction coils 253. An alternating electrical voltage is applied to the induction coils 253 by means of an alternating current source 254. An alternating current may flow through the induction coils 252 in the low frequency range, e.g., in a range between 50 Hz and 300 Hz, in the medium frequency range, e.g., in a range between 200 Hz and 100 kHz, or in the high frequency range, e.g., in a range between 100 kHz and 3 GHz. As a result, the induction coils 253 induce alternating fields or generate eddy currents in the abutment part 220 and/or in the contour surface 150a, thereby heating the cavity.

Furthermore, while applying a compression pressure, the layered structure 100 in the cavity 205 is cooled to a solidification temperature that is, for example, lower than the melting point of the thermoplastic matrix material 20. In FIG. 2, the compression pressure is applied solely by evacuating the cavity 205 using the pump 230. For cooling of the layered structure 100, the induction heating device 252 is turned off. Due to the low heat capacity of the mold plates 211, 221, the cavity 205 cools quickly and the matrix material 20 solidifies within a short time. Optionally, the induction heating device 252 may also be slowly or gradually reduced in power to maintain a certain cooling rate. Optionally, additional cooling of the cavity 205 may be performed. Optionally, a thermal insulating medium (not shown) may also be located around the abutment member 220 and/or the contour surface 150*a* to reduce energy dissipation during heating.

In FIG. 3, the layered structure 100 is located in the cavity 205 formed between the mold plates 211, 221. Thereby, the cavity 205 is hermetically sealed by means of the optional seal 215. In FIG. 2, the contour surface 150*a* is formed by the inner surface 210*a* of the first mold plate 211. The second mold plate 221 forms the abutment member 220. Alternatively, the abutment member 220 can also be formed by a vacuum foil (not shown). In FIG. 3, the first mold plate 211 is supported by the first surface 310*a* of the forming part 310 or by the surface portion 312 of the forming part 310. Further, an optional insulation layer 311 is disposed between the first surface 310*a* of the mold part 310 and the back surface 210*b* of the first mold plate 211.

The cavity 205 is optionally evacuated by means of a pump or vacuum device 230, which is fluidically conductively connected to the cavity 205. As a result of the evacuation, air that may be contained in the layer structure 100 is sucked out of the layer structure.

In a further step, a force F is applied to the form plates 211, 221 in such a way that the layered structure 100 between the form plates 211, 221 is compressed or subjected to a compression pressure. In FIG. 3, this force F is generated by generating a magnetic field directed transversely to the contour surface 150*a*, which is coupled into a magnetizable material associated with the abutment member 220 and/or into a magnetizable material associated with the contour surface 150*a*. In FIG. 3, the first and/or second mold plates 211, 221 comprise or are formed of a magnetizable material, whereby the magnetizable material is associated with the mold plates 211, 221. For example, one of the mold plates 211, 221 or both mold plates 211, 221 may be formed of stainless or invar steel. Generally, the abutment member 220 and/or the contour surface 150*a* may be formed of a magnetizable material, whereby the magnetizable material is associated with the abutment member 220 or the contour surface 150*a*, respectively. However, the magnetizable material may also be associated with the contour surface 150*a* and/or the abutment member 220 by being attached to the abutment member 220 and/or the contour surface 150*a*. For example, in FIG. 3, the mold half 310 or the surface portion 312 of the mold half 310 may be formed of a magnetizable material.

As further shown schematically in FIG. 3, a first magnet device 240 is provided for generating the magnetic field. In FIG. 3, the first magnet device 240 is exemplarily implemented in the form of an electric magnet device with a plurality of electric induction coils 241. In general, the first magnet device 240 is configured to generate a magnetic field and thus may also comprise one or more permanent magnets instead of the induction coils 241. Thus, the first magnet device 240 generally comprises one or more magnetic field generators configured to generate a magnetic field. Thus, the following discussion of induction coils 241 applies generally to magnetic field generators. The induction coils 241 are distributed along the contour surface 150*a*. For this purpose, the induction coils 241 may, for example, be arranged in the region of the mold half 310 or integrated therein, as is shown by way of example in FIG. 3. However, it is also conceivable to distribute the induction coils 241 along the contour surface 150*a* by arranging them on sides of the abutment part 220. For example, the induction coils 241 may be arranged on an outer surface 220*b* of the abutment member 220 opposite to the inner surface 220*a* (not shown). By applying an electrical voltage to the coils 241, a magnetic field is induced in the magnetizable material, which pulls or presses the contour surface 150*a* and the abutment member 220, i.e., in FIG. 3 the mold plates 211, 221, together relative to each other, thereby compressing the layered structure 100. Alternatively, a second magnet device (not shown in FIG. 3) may also be associated with the contour surface 150*a* or the abutment member 220. The second magnet device may also be implemented as an electric magnet device, as described above for the first magnet device 240. It is also conceivable that the second magnet device is formed by one or more permanent magnets. In general, the first magnet device 240 may be arranged on the abutment member 220 or the contour surface 150*a* and the second magnet device is arranged on the respective other one of the abutment member 220 and the contour surface 150*a*. Thus, a magnetic field can be generated by each of the magnetic devices that interacts with the magnetic field of the other one of the magnetic devices and extends through the layered structure 100 so that the abutment member 220 and the portion forming the contour surface 150*a* are attracted to each other.

Further, heating of the layered structure 100 in the cavity to the first temperature and cooling of the layered structure to the solidification temperature is performed while applying the compression pressure for consolidation. The insulating layer 311 largely avoids heating the mold half 310 during heating. Heating can be carried out, for example, by means of infrared radiation. As shown schematically and by way of example in FIG. 3, the heating device 250 can be designed for this purpose as an infrared radiator 251, which is arranged on the sides of the abutment member 220. Optionally, a further infrared radiator (not shown) can be arranged on the sides of the contour surface 150*a*. Generally, the infrared radiator 251 is configured for generation of heat radiation to heat the cavity 205. Alternatively, the heating may be performed inductively, as described with reference to FIG. 2. The cavity 205 may continue to be evacuated both during heating and during cooling.

In FIG. 4, the compression pressure is also applied by a magnetic field generated by means of a magnetic device 240, as described above with reference to FIG. 3. In contrast to FIG. 3, the contour surface 150*a* is formed by the first surface 310*a* of the mold half 310. A further difference to FIG. 3 is that the heating device 250 is designed as an induction heating device 252 and heating of the cavity is performed inductively, as described above.

FIG. 15 shows an example of a further tool arrangement W. The tool arrangement W shown in FIG. 15 differs from the tool arrangement W shown in FIG. 3 in particular in the arrangement and design of the magnet device 240 as an electric magnet device. In FIG. 3, a magnetizable material is associated with the first mold plate 211 in that the mold plate 211 itself comprises a magnetizable material. In the exemplary tool arrangement shown in FIG. 15, the induction coils 241 are connected to a planar support structure 242 and are arranged in a planar manner distributed over the support structure 242, for example in a grid-like manner, as exemplarily shown in FIG. 16. The support structure 242 is elastically deformable and may in particular be formed from a flexible material, such as rubber, silicone or the like.

As a result, a uniform pressure distribution is achieved even in the presence of mold inaccuracies. Optionally, the support structure 242 may be locally fiber or wire reinforced to prevent damage such as bursting. Moreover, due to the flexibility of the support structure 242, the magnet device 240 can be used for different shapes. FIG. 15A shows an enlarged detail of FIG. 15. The coils 241 are indicated with a coil winding The grid-like arrangement of the induction coils 241 as repeating, identical elements, shown as an example in FIG. 16, reduces device costs.

Optionally, flexible cushions 243 are embedded in the support structure 242 to further improve pressure distribution in the region of a respective induction coil 241. The cushions 243 may be formed of a flexible material and filled with a flowable medium such as air, water, oil, sand or the like. The soft cushions 243 underneath the induction coils 241 transmit the pressure uniformly even in the presence of mold inaccuracies and, if necessary, laterally.

Further optionally, a rigid plate element 244 may also be disposed between a respective induction coil 241 and the support structure 242 to further improve pressure distribution.

As can be seen in FIG. 15, the magnet device 240 with the support structure 241 can be placed on the outer surface 220b of the contact part 220. For application of the compression pressure, the induction coils 241 of the magnet device 240 are energized, preferably with a direct current. As a result, these induce a magnetic field so that the magnet device 240 and the first mold plate 211 are attracted to each other and the layered structure 100 is compressed between the mold plates 211, 221.

As further shown in FIG. 15, the heating device 250 can optionally be designed as an induction heating device 252, which heats the first mold plate 211. For this purpose, the induction heating device 252 is integrated into the mold part 310. Optionally, the induction coils 241 of the magnet device 240 can also be used as induction heating device. For this purpose, an alternating current of suitable frequency flows through these.

Optionally, the coils 253 of the heating device 250 may also be used as magnetic field generating coils. In this case, the heating device 250 forms a second magnet device associated with the abutment member 150a. Thus, the pressure for pressing the layered structure 100 can be generated essentially by the attractive forces between the induction coils 241 of the magnet device 240 and the coils 253 of the heating device 250, since the coils 241, 253 transmit the resulting forces accordingly to the elements located therebetween. This results in a particularly large attractive force between two opposing coils 241, 253, which advantageously increases the compression pressure.

Furthermore, it is conceivable to operate the coils 243 and/or 253 in a first step in a mode in which they inductively heat the contour surface 150a and the abutment member 220 and, after sufficient heating of the layer structure 100, to operate them in a second step as electromagnets in such a way that the layer structure 100 is pressed together between the abutment member 220 and the contour surface 150a.

Although the present invention has been explained above by way of example with respect to certain embodiments, it is not limited thereto, but can be modified in a variety of ways. In particular, combinations of the preceding exemplary embodiments are also conceivable.

REFERENCE LIST 1 semi-finished product
1A, 1B ends of the semi-finished product
2 prepreg tapes
2A first prepreg tape
2B second prepreg tape 3 connecting strands
4 sheet structure
5A, 5B connecting lines
6 multiaxial fabric
11 first semifinished product
12 second semi-finished product
20 thermoplastic matrix material
21 reinforcing fibers
30 thermoplastic plastics material
31 first end section of the connecting strands
32 second end section of the connecting strands
33 foil tape
34 thread
35 filaments
41 first end region of the sheet structure
42 second end region of the sheet structure
60 layers
100 layered structure
110 layer
120 junction
130 stiffening profiles
150a disposition surface
205 cavity
211 first mold plate
210a inner surface of the first mold plate
210b back surface of the first mold plate
215 seal
220 abutment member
220a inner surface of the abutment member
220b outer surface of the abutment member
221 second mold plate
230 pump
240 magnet device
241 induction coils
242 support structure
243 cushions
250 heating device
251 infrared radiator
252 induction heating device
253 induction coils
254 AC power source
310 mold half
310a first surface of the mold half
310b second surface
311 insulation layer
312 surface portion of the mold half
314 base section of the mold half
315 standing feet
316 stiffening ribs
410 depositing head
420 movement device
B structural component
b2 width of the prepreg tapes
E peripheral edge of the structural component
F force
length of the prepreg tapes
P vertex
R1 first direction
R2 second direction
R110 direction
S1, S2 symmetry lines
W tool arrangement

The invention claimed is:
1. A method of manufacturing a structural component comprising:
    providing a layered structure preformed according to a shape of the structural component to be manufactured, comprising a plurality of layers each having reinforcing fibers embedded in a thermoplastic matrix material;

heating the layered structure in a cavity formed between a contour surface and an abutment member to a first temperature greater than a melting point of the thermoplastic matrix material; and cooling the layered structure in the cavity to a solidification temperature lower than the melting point of the thermoplastic matrix material while applying a compression pressure;

wherein the compression pressure is generated by producing a first magnetic field directed transversely to the contour surface by a first magnet device, wherein the first magnetic field is coupled into a magnetizable material associated with the abutment member or wherein the first magnetic field is coupled into a magnetizable material associated with the contour surface or wherein the first magnetic field interacts with a second magnetic field generated by a second magnet device associated with the other of the abutment member or the contour surface in such a way that the layered structure is subjected to the compression pressure by the contour surface and the abutment member, wherein the first magnetic field is spatially concentrated but distributed over the contour surface or the abutment member in a planar manner and generates the compression pressure, wherein the contour surface is provided by an inner surface of a first mold plate, wherein the abutment member is formed by a second mold plate, wherein each of the first mold plate and the second mold plate is formed as a flatly-extending plate-shaped component having a constant thickness.

2. The method of claim 1, wherein the first magnet device is disposed on the abutment member or on the contour surface and wherein the first magnetic field generated by the first magnet device extends through the layered structure.

3. The method according to claim 1, wherein the heating of the layered structure is carried out by inductive heating or by infrared radiation.

4. The method according to claim 1, wherein the cavity is evacuated by a vacuum device.

5. The method according to claim 4, wherein the abutment member is formed by a vacuum film.

6. The method of claim 1, wherein a seal is disposed between the first mold plate and the contour surface which hermetically seals the cavity.

7. The method according to claim 1, wherein at least one stiffening profile comprising a thermoplastic material is placed on a layer of the layered structure located opposite to the contour surface, wherein the stiffening profile is pressed against the layered structure in the cavity by the abutment member.

8. The method according to claim 1, wherein the contour surface is provided by a first surface of a mold half.

9. The method of claim 1, wherein the first mold plate is supported by a first mold half.

10. The method according to claim 1, wherein the individual layers of the layered structure each have at least one semi-finished product comprising:

a plurality of prepreg tapes extending along each other, each comprising unidirectionally arranged reinforcing fibers embedded in thermoplastic matrix material; and a plurality of connecting strands comprising a thermoplastic plastics material, said connecting strands and said prepreg tapes joined to form a textile sheet structure in which each of said connecting strands crosses a plurality of said prepreg tapes, and wherein the connecting strands and the prepreg tapes in a first end region of the sheet structure and in a second end region of the sheet structure located opposite thereto are each connected to one another in a materially joined manner along a respective connecting line.

11. The method according to claim 10, wherein the connecting strands each comprise a first end portion and a second end portion located opposite thereto, the first and second end portions each projecting beyond the connecting lines, and wherein a respective layer of the layered structure is formed by thermoplastically joining at least the first end portions of the connecting strands of a first semi-finished product to prepreg tapes of a respective further semi-finished product, and wherein the second end portions of the connecting strands of the further semi-finished product are thermoplastically joined to prepreg tapes of the first semi-finished product.

12. The method according to claim 1, wherein the layers of the layered structure are formed by semi-finished products which comprise:

a plurality of prepreg tapes, each comprising unidirectionally arranged reinforcing fibers embedded in a thermoplastic matrix material, wherein the prepreg tapes are arranged to form a multiaxial fabric comprising a plurality of superimposed layers of prepreg tapes, wherein the prepreg tapes within a layer run parallel to one another, and wherein the layers are joined relative to one another at individual points.

13. The method according to claim 1, wherein the providing of the layered structure occurs by depositing prepreg tapes by a depositing head, and wherein the individual prepreg tapes are fixed relative to one another during deposition.

14. The method according to claim 1, wherein the layered structure is formed such that the reinforcing fibers extend along one direction within a respective layer and in different directions in different layers.

15. The method according to claim 1, wherein the contour surface has a curved geometry.

16. The method according to claim 1, wherein the first and second mold plates are dome-shaped.

* * * * *